UNITED STATES PATENT OFFICE.

JOHN SORLEY, OF FEILDING, NEW ZEALAND.

COMPOSITION FOR THE DESTRUCTION OF INSECTS.

1,057,678. Specification of Letters Patent. Patented Apr. 1, 1913.

No Drawing. Application filed June 1, 1911. Serial No. 630,658.

*To all whom it may concern:*

Be it known that I, JOHN SORLEY, subject of the King of Great Britain, residing at Feilding, in the Dominion of New Zealand, have invented a new and useful Improved Composition for the Destruction of Insects; and I do hereby declare the following to be a full, clear, and exact description of the same.

This invention relates to a composition that has been devised specially for use in the destruction of garden insects and pests, such as aphis, green fly, leech, cabbage moth, scale, caterpillars and other insects.

The composition devised consists in a mixture of xylene, soft paraffin and sulfur mixed with sufficient soft soap and water to form an emulsion. This emulsion for use is then dissolved in a sufficient quantity of water and the mixture sprayed upon the trees or plants to be treated.

The proportions of the ingredients may be varied to suit different purposes and classes of insects being treated. The following relative quantities will, however form a fair average strength for the composition viz:— xylene 2 ozs. 6 drams, soft paraffin 1 oz. 3 drams, sulfur 16 grains. These quantities are mixed with a gallon of water in which one dram of the soft soap has been dissolved to form a solution. The other ingredients are added to the solution formed by the water and soft soap and an emulsion thus formed which may be sprayed on to the affected parts of the tree or shrub. More or less water may be added to vary the strength of the emulsion to suit the requirements of each case being treated.

What I do claim as my invention, and desire to secure by Letters Patent is:—

1. A composition for the destruction of insects consisting in a combination of xylene with a soft paraffin and sulfur mixed with a solution of soft soap and water.

2. A composition for the destruction of insects, comprising about 2 ounces 6 drams of xylene, 1 oz. 3 drams of soft paraffin and 16 grains of sulfur emulsified with one gallon of water having one dram of soft soap therein.

In testimony whereof, I have signed this specification in the presence of two subscribing witnesses.

JOHN SORLEY.

Witnesses:
H. ALEXANDER,
M. E. BROWN.